(12) United States Patent
Marino et al.

(10) Patent No.: US 6,681,391 B1
(45) Date of Patent: Jan. 20, 2004

(54) METHOD AND SYSTEM FOR INSTALLING SOFTWARE ON A COMPUTER SYSTEM

(75) Inventors: Phillip J. Marino, Dublin, OH (US); David V. Winkler, Seattle, WA (US); Crista Johnson, Seattle, WA (US); William M. Nelson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 427 days.

(21) Appl. No.: 09/598,521

(22) Filed: Jun. 21, 2000

(51) Int. Cl.$^7$ .............................................. G06F 9/445
(52) U.S. Cl. ...................... 717/175; 717/174; 717/176; 711/217; 711/133; 711/134; 711/154; 711/158; 711/165; 709/102
(58) Field of Search ................................ 717/174–178; 711/217, 133, 134, 154, 158, 165; 709/102

(56) References Cited

U.S. PATENT DOCUMENTS

| | | | | |
|---|---|---|---|---|
| 5,499,357 A | * | 3/1996 | Sonty et al. ................ | 710/104 |
| 5,721,824 A | * | 2/1998 | Taylor ......................... | 709/203 |
| 5,768,566 A | * | 6/1998 | Harikrishnan et al. ...... | 717/170 |
| 5,835,777 A | * | 11/1998 | Staelin ........................ | 717/175 |
| 5,963,743 A | * | 10/1999 | Amberg et al. ............. | 717/174 |
| 5,995,757 A | * | 11/1999 | Amberg et al. ............. | 717/175 |
| 6,202,121 B1 | * | 3/2001 | Walsh et al. ................ | 711/100 |
| 6,237,144 B1 | * | 5/2001 | Delo ........................... | 717/174 |
| 6,301,708 B1 | * | 10/2001 | Gazdik et al. .............. | 717/175 |
| 6,327,706 B1 | * | 12/2001 | Amberg et al. ............. | 717/174 |
| 6,442,684 B1 | * | 8/2002 | Lee et al. .................... | 713/1 |
| 6,442,754 B1 | * | 8/2002 | Curtis ......................... | 717/175 |

OTHER PUBLICATIONS

Aguilera, Luiz Manoel, Penz, Bernard, Song, Heping, & Binder, Zdenek, "Design and Implementation of a Scheduling Software System", Oct. 1993, p. 276–282, retrieved from IEEE database Feb. 2, 2003.*

Cormen, Thomas H., Leiserson, Charles E. & Rivest, Ronald L, "Intorduction to Algorithms", p. 477–493, 1989, McGraw–Hill Book Company.*

Sauerhoff, Martin, Wegener, Ingo, Wercner, Ralph, "Optimal Ordered Binary Decision Diagrams for Tree–like Circuits", p. 1–20, 1996, retrieved from IEEE database, Feb. 3, 2003.*

Willis, R. R., Jensen, E.P., "Computer Aided Design of Software Systems", P. 116–125, 1979, retrieved from ACM Portal database Feb. 3, 2003.*

Shimon Even, "Graph Algorithms," Chapter 3, pp. 53–69, Technion Institute, Computer Science Press, 1979.

\* cited by examiner

*Primary Examiner*—Tuan Q. Dam
*Assistant Examiner*—Mary Steelman
(74) *Attorney, Agent, or Firm*—Leydig, Voit & Mayer, Ltd.

(57) ABSTRACT

A method and system for installing software on a computer generates an installation order that ensures that a component required for the functioning of another component is already installed. Furthermore, it makes possible generating good installation orders to allow related components, e.g., in a software suite, to be installed close together, thus reducing disk swapping. The method and system take into account the existing configuration on a computer and allow removal of components along with dynamic reconfiguration of a computing system in response to a user's choice of an application program to launch. In accordance with the invention, preferably a developer includes information about the component's relationship with other components, e.g., a specific requirement for a preinstalled component or a requirement that a particular component not be present, thus requiring its removal. To remove the possibility of a single identifier referring to more than one component, the preferred embodiments of the invention use globally unique identifiers to label individual components.

40 Claims, 7 Drawing Sheets

METHOD AND SYSTEM FOR INSTALLING SOFTWARE ON A COMPUTER SYSTEM

TECHNICAL FIELD

This invention relates generally to the installation and operation of software on computer systems and more particularly to the installation of or upgrades to a group of related programs, such as those in a software suite.

BACKGROUND

A typical software product may be organized into a group or "suite" of individual component programs, or "components." For example, STRUCTURED QUERY LANGUAGE (SQL) SERVER is a software product developed by the MICROSOFT corporation that includes several components, such as the core SQL binaries (including the SQL dynamically linked library (DLL)), the INTERNET EXPLORER program and the MICROSOFT DATA ACCESS COMPONENTS (MDAC) program. The SQL SERVER software product may therefore be considered a suite. Typically, a suite includes several distinct software products, each having its own components and possibly sharing one or more components with other products in the suite. A suite also advantageously allows coordinated marketing and packaging of related software products with concomitant improvement in reliability and inter-operation of the components. An example of such a suite is BACKOFFICE SERVER by MICROSOFT, which groups several MICROSOFT products, including SQL SERVER, EXCHANGE SERVER, HOST INTEGRATION SERVER (HIS), FAX SERVER, SYSTEMS MANAGEMENT SERVER (SMS), MS SEARCH, and MDAC into a single software suite. A partial list of the components in the BACKOFFICE suite includes SQL SERVER, EXCHANGE SERVER, INTERNET EXPLORER, MS SEARCH, and MDAC.

Many components of a software suite may not be required for installation of the suite as a whole, but may, instead, be included as enhancements or options. The developer of the suite, however, may wish to require that some of the components be installed when the software suite is being used for certain scenarios. For example, if the software suite is installed on a computer system that is a part of a multi-location network, the suite developer may wish to require that more networking components be installed than in a stand-alone scenario. Of course, some components may be required regardless of the scenario in which the suite is being used.

A developer of a software suite may also wish to insure that when a user installs a software suite on a computer system, the system is first brought to a predetermined state in terms of which programs are initially installed. This simplifies the suite installation process by eliminating the need to account for all of the different versions of components that may already be installed on the system. For example, the suite developer may wish to require that every computer system on which the suite will be used is running the latest version of a particular operating system before allowing the full suite to be installed. Although this approach saves the developer the trouble of having to write a different setup procedure for each version of the operating system, it requires that the user does not find the upgrading or installation process uneconomical and/or difficult.

Alternatively, setup may be implemented with the aid of unattended data files. A single installation script may be used to install the program, and, for each individual computing environment the script can be edited to account for the peculiar requirements of that context. The disadvantage of this method is that it requires an administrator to spend a considerable amount of time editing each individual script to tailor it to particular configurations.

It is desirable to have a setup procedure that is flexible enough to automatically configure the setup strategy to take into account different preexisting configurations in the course of generating a valid installation order. Such a procedure is likely to be useful in contexts other than merely installing suites. It may be used to address security concerns, protect intellectual property rights, provide another tool for applications such as computer games to provide context dependent functionality dynamically and, of course, make installation of applications user friendly.

SUMMARY OF THE INVENTION

In accordance with the foregoing, the invention provides a method and system for installing a software suite with multiple components on a computer system such that the determination of components to be installed or removed is made fully or partially transparent to the user. Installing suites typically requires shuffling various CDs or other media, and on occasion, in case of sophisticated software, the aid of an administrator/technician to properly install the required components in an acceptable order. This exercise can easily become tedious.

The use of wizards aids installation provided the starting state of the system is well known and no conflict results due to improper installation strategies. Furthermore, in systems with limited resources it is desirable to remove software not needed in order to free up resources and this exercise cannot be efficiently managed on the fly. Such installation/removal related problems are among those handled by teachings in accordance with this invention. In accordance with the invention, a few or all of the components in a suite of interest are modified to include information pertinent to their installation.

The installation process taught by the invention further facilitates generation of a good installation order. A good installation order results in related components and sub-components being installed together. Given an installation order, the invention also allows a determination to be made if the installation order is valid. Furthermore, determination of an installation order in accordance with the invention allows many different user configurations to be detected and modified as required without requiring expensive oversight or trouble-shooting to install a suite of interest, including via automated installations.

Briefly, the invention requires that a suite, and preferably each component of the suite, includes specification of its installation-affecting relationships along with an acceptable installer, in particular if the installer is different from a default installer. Some examples of installation-affecting relationships include dependency or mutual-exclusion. In a dependency relationship a first component depends on a second component if the second component has to be present prior to the installation of the first component. In contrast, a mutual-exclusion relationship between two components requires that only one of them can be present in a computing environment, or a sub-part of a computing environment, thus requiring the removal of one, if present, to install the other.

This information is collected for all of the components to be installed in a suite and evaluated in the context of the components already present in the computing environment. The installation-affecting relationships are used to generate an installation-affecting-relationship tree in which paths representing potential installation orders are identified with a preference for paths requiring the least number of scope transitions, i.e., changes in installers. A preferred implementation has the parent of a node in the tree also correspond to an acceptable installer for a child node.

An advantageous method for discovering a good installation order organizes the installation-affecting relationships in a matrix format. The matrix itself is constructed from developer supplied information about a component's installation-affecting relationships. Corresponding to this matrix, indexed by components already present in the system, i.e. defining a configuration, and components to be installed, a tree is constructed to reflect the installation-affecting relationships between the various components. Traversing the tree in a depth first manner with suitable choice of defaults generates a good installation order.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed in a computing environment. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
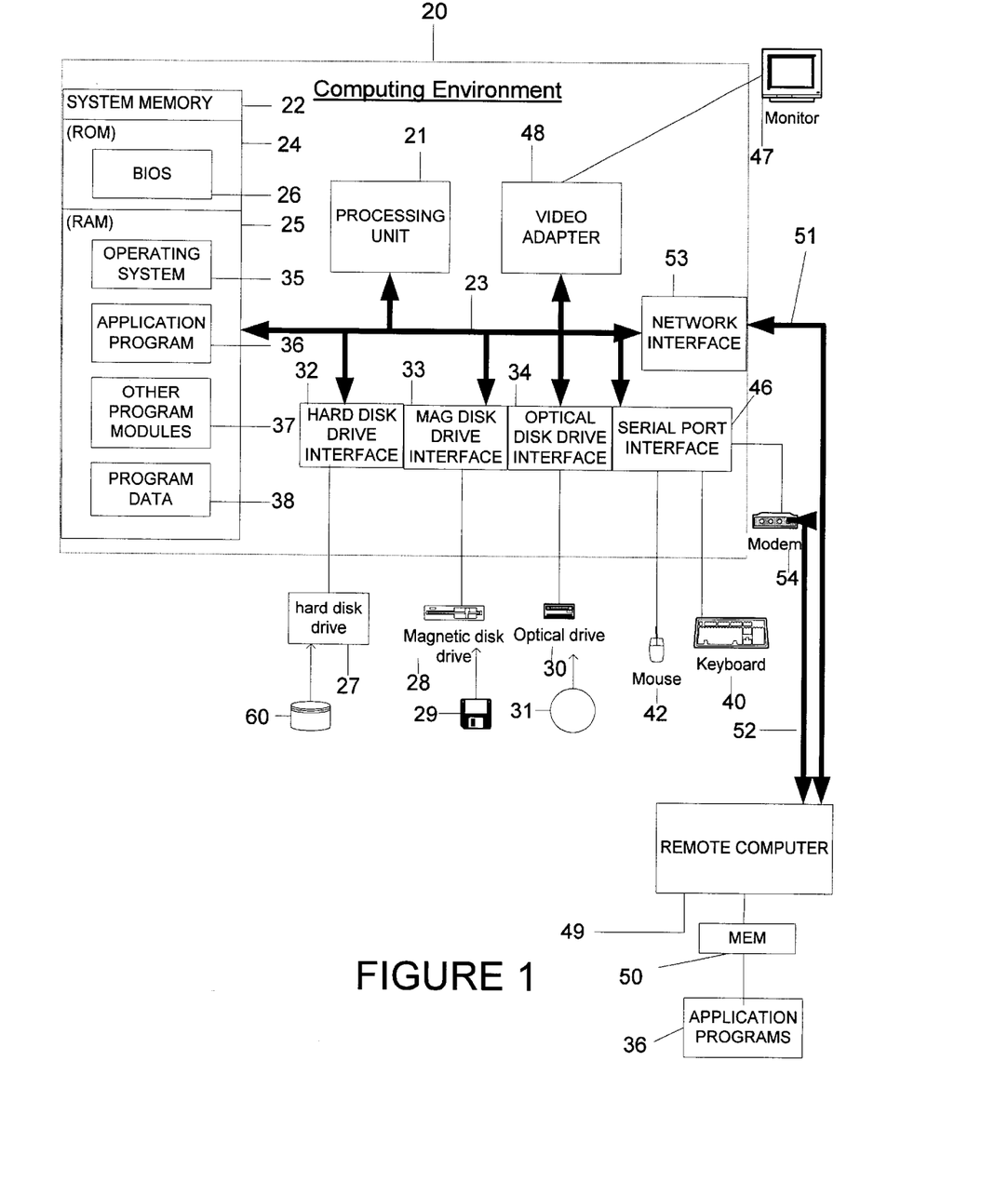
FIG. 1 is a block diagram generally illustrating an exemplary computing environment on which the present invention may be used.

With reference to FIG. 1, an exemplary system for implementing the invention includes a general purpose computing device in the form of a conventional computing environment 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computing environment 20, such as during start-up, is stored in ROM 24. The computing environment 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computing environment 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

Computing environment 20 includes computer readable media such as volatile and nonvolatile, removable and non-removable media implemented in any technology or method for information storage such as computer instructions, data structures, program modules and the like. Computer storage media includes, but is not limited to, RAM, ROM, EEPROM, flash memory, or other memory technology, CD-ROM, Digital versatile disks ("DVD") etc. that can be used to store and access the information. Communication media typically includes computer readable instructions, data structures, program modules or data in a modulated data signal such as a carrier wave.

A number of program modules may be stored on the hard disk 60, magnetic disk 29, optical disk 31, ROM 24 or RAM 25, including an operating system 35, one or more applications programs 36, other program modules 37, and program data 38. Application programs 36, other program modules 37, and operating system 35 typically comprise several components and sub-components that interoperate and may be shared. A user may enter commands and information into the computing environment 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is preferably connected to the system bus 23 via an interface, such as a video adapter 48. In addition to the monitor, computing environments typically include other peripheral output devices, not shown, such as speakers and printers.

The computing environment 20 may operate in a networked environment using logical connections to one or more remote computers, such as a remote computer 49. The remote computer 49 may be another computing environment such as a server, a router, a network PC, a peer device or other common network node, and typically includes many or all of the elements described above relative to the computing environment 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computing environment 20 is connected to the local network 51 through a network interface or adapter 53. When used in a WAN networking environment, the computing environment 20 typically includes a modem 54 or other means for establishing communications over the WAN 52. The modem 54, which may be internal or external, is connected to the system bus 23 via the serial port interface 46. In a networked environment, program modules depicted relative to the computing environment 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. It should be noted that the invention may be described in the general context of computer executable instructions executed in one or more computing environments 20. Generally, program modules include routines, programs, objects, components, data-structures, etc. that perform particular tasks or implement particular abstract data types. Typically the functionality of the program modules may be combined or distributed as desired in various embodiments. However, while the invention is being described in the foregoing context, it is not meant to be limiting as those of skill in the art will appreciate that various of the acts and operation described hereinafter may also be implemented in hardware.

In the description that follows software is installed on and for operation in a computing environment 20 similar to that illustrated in FIG. 1, including, possibly, networked implementations of computing environment 20. It is customary for computer software to be designed as a collection of several interacting components or sub-components. The components or sub-components may individually or as a combination provide desired functionality to a particular software package. This design scheme is made even more useful if a sub-component may be reused. An example of such a scheme is the definition of interfaces provided pursuant to the Component Object Model ("COM") specification. It should be noted that in many contexts the terms components and sub-components are used interchangeably without implying exclusion of one or the other.

However, the ability to describe and specify interfaces such that components may be used as building blocks is not sufficient to allow any set of components to be combined to generate a desired functionality. Additional knowledge is required about the interactions between the components to avoid conflicts or provide required preinstalled components. At the level of applications packaged in suites with each application having many components, the frequent revisions and fixes result in changes that further require careful attention to ensure that the applications and their component parts continue to interact in an error free manner. Of course, components of applications need not be COM-compliant in order to practice the invention.

A developer developing software is often aware of such limitations and requirements of the particular component or application that are part of the design parameters, e.g., due to extensive testing or deliberate planning. Such information can be quite extensive and confusing to an average user if provided in raw form. In general, installing an application may require that a particular version of the application be already installed for an upgrade, or that a required component be present or not be present and many other possible relationships. However, for proper configuration of software it is necessary to either provide this information or develop several packages of software designed for installation in different contexts. Thus, in an exemplary situation one may need one software package for upgrading from version 1.0 of a software release and another software package to upgrade from version 2.5 of the same software release.

This complexity can be avoided without forcing developers to write self contained applications by using better installation software that allows for dynamic adjustment of the installation order to suit various configurations encountered in actual systems. Advantageously, the peculiar installation-affecting relationship information for a component/application can be included in the component/application itself such that it can be discovered and utilized by a suitable setup program. Alternatively, such information may be provided with a software suite for the components contained therein. An installation program may then obtain information about all known installation-affecting relationships. An installation-affecting-relationship-manager is used to integrate information from the various components to deduce an installation order that is valid, and good. A good installation order is not only valid, but is responsive to software suite structures to facilitate installing related components together. In particular, a good installation order should result in reducing the need to swap computer media, such as CD-ROMS and the like.

In this context it is useful to consider the customary methods of packaging software. Software may be downloaded, typically in compressed files, over networked computers, including those connected to the Internet. Alternatively, software may be provided in the form of magnetic media, e.g., diskettes, or compact disks ("CD"). A typical suit may be provided on several CDs or diskettes. Related software components are often placed close to each other on the media used to provide the software. Thus, one of the aims of packaging software is to attempt to reduce the number of swaps required in course of a successful installation.

In accordance with the invention developers, or another party, packaging software components include information about the installation-affecting relationships for the software components such that it is accessible through appropriate interfaces to the installing software. Software components are installed by the installing software, and are advantageously packaged such that components installed by a given installer are packaged together. Such components may be termed within the "scope" of the installer. An aim of a well designed and packaged software suite is to reduce the number of scope transitions during installation.

In order to achieve this goal each software component is advantageously identified unambiguously with the help of unique identifiers since it is possible that two different developers may choose the same name for their respective software components thus defeating the need to identify the installation-affecting relationships for a component. Advantageously, it is possible to identify a software component by a Globally Unique Identifier ("GUID"). GUIDs are 64 or 128 bit numbers generated using well-known algorithms that assure that no two numbers would be generated again. An example of a GUID generating algorithm is provided in P. L. Leach and R. Salz, "UUIDs and GUIDs," Internet Engineering Task Force (IETF). Work in progess, Document identifier draft-leach-uuids-guids-01.txt, Feb. 4, 1998. Naturally, any other method of generating unique identifiers could also be used to implement some of the embodiments of the invention. The use of unique identifiers allows specification of the installation-affecting relationships between software components without regard to the convenient names or versions chosen for reasons other than ensuring uniqueness for various software components.

Furthermore, it should be noted that most components are likely to have a default installation-affecting relationship with other components. An expected default relationship is a "don't-care" relationship where functioning of a component is not affected by either the presence or absence of another component. Thus a matrix defined by entries reflecting the installation-affecting relationship between components corresponding to the row and column definition is likely to be a sparse matrix. Such a matrix is advantageously managed using strategies and data structures suitable for storing and manipulating sparse matrices. Some familiar strategies include using linked lists, wherein the overhead of maintaining and traversing a linked list is advantageously offset by the savings in the memory and speed in managing the matrix. Naturally, other data structures, including matrices, may be used as well within the intended scope of the invention.

A familiar installation-affecting relationship is a "dependency" relationship. As used in a preferred embodiment, a first software component is said to 'depend upon' a second component, or has a dependency upon the second component, if the second component is required to be installed before the first component is installed. Here, the first component is a dependent component while the second component is a dependency component. A dependency relationship is fulfilled when the dependency component is installed before the dependent component. A valid installation order for a set of components is the order in which they should be installed such that all dependencies are fulfilled. In the following discussion installation of software using a dependency relationship will be used to demonstrate the use of installation-affecting relationships in accordance with the invention.

Figure 2:
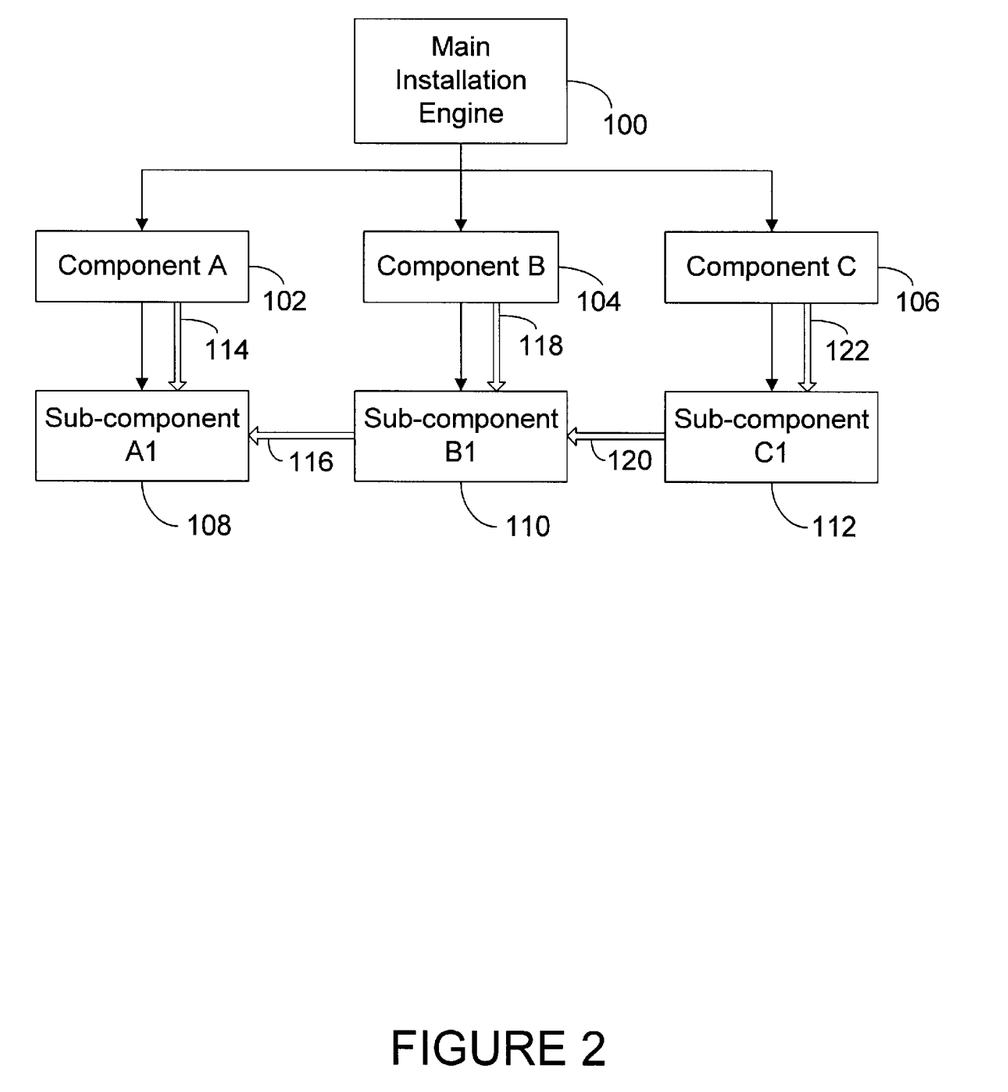
FIG. 2 is a block diagram generally illustrating installation and installation-affecting relationships between components/sub-components to be installed in a computing environment.

FIG. 2 illustrates a possible organization of software suite to be installed comprising three components. There is a main installation engine 100 that installs components A 102, B 104, and C 106. Component A 102 installs a sub-component A1 108 while component B 104 installs sub-component B1 110 and component C 106 installs sub-component C1 112. This installation information is known by each component or sub-component in FIG. 2. However, installation is further modified by installation-affecting relationships, which include dependency relationships in this exemplary embodiment. As illustrated by the arrow 114, sub-component A1 108 is dependent on component A 102 and arrow 116 represents the dependency of sub-component A1 108 on sub-component B1 110. Sub-component B1 is dependent on component B 104 as is shown by arrow 118, and, furthermore component B1 110 depends on C1 112 as is shown by arrow 120. Arrow 122 represents the dependency of sub-component C1 112 on component C 106. A matrix may be used to represent the dependency relationships as is shown in the table below with "DF" denoting a default value.

TABLE 1

|     | A  | A1 | B  | B1 | C  | C1 |
|-----|----|----|----|----|----|----|
| A   | DF |    |    |    |    |    |
| A1  | A  | DF |    | B1 | B1 | B1 |
| B   |    |    | DF | B1 |    |    |
| B1  |    |    | B  | DF | C1 | C1 |
| C   |    |    |    |    | DF | DF |
| C1  |    |    |    |    | C  | DF |

In the above example, an inspection of FIG. 2 reveals that a valid installation order should install sub-component B1 110 prior to installing sub-component A1 108. Consequently, component B 104 has to be installed prior to sub-component A1 108 in a valid installation order. Similarly, component C1 112 has to be installed prior to installing component B1 110. Some valid installation orders include C, B, C1, B1, A, and A1 or A, B, C, C1, B1, A1 and the like. Clearly, an installation order such as C, C1, B, B1, A, and A1 is a good installation order since it installs related components/sub-components close together. In general, inspection is not a feasible option for deducing a valid and/or good installation order and a more general and automated method and system are desirable.

Examining Table 1 reveals a matrix having its rows and columns indexed by components where if a component has sub-components, they are represented in order following the component. Advantageously, matrix entries that are non-zero and/or non-default values reflect dependency relationships between the components/sub-components corresponding to the matrix indices for such matrix entries. Conveniently, if the row index of an entry is not equal to the column index then the non-default entry identifies the component/sub-component on which the component/sub-component corresponding to the row index dependent. Furthermore, the matrix can be modified in accordance with relaxation to discover if any of the entries have indirect dependencies. As an example, in Table 1, subcomponent A1 is indirectly dependent on sub-component C1 since subcomponent A1 is directly dependent on subcomponent B1, which, in turn, is directly dependent on C1. Thus, the matrix in Table 1 and the graph in FIG. 2 describe the same dependency relationships and the graph in FIG. 2 can be constructed by examining the matrix.

Constructing an installation-relationship matrix is advantageously performed by discovering if for any particular component/sub-component there is a dependency from other components present in the system or to be installed during the installation of a suite of interest. Such a discovery process can be performed using an interface, e.g., an interface compliant with the COM specification, provided by each component/sub-component to discover such relationships. The rows of the matrix correspond to components/sub-components to be installed while the columns correspond to components/sub-components present in the system and/or to be installed. Following the construction of the entries for direct dependencies, the matrix is scanned to discover and complete the indirect dependencies via relaxation described above. For the indirect dependencies, in an embodiment of the invention, only the first link in the chain is represented. As an example, the entry corresponding to dependency between sub-components A1 and C1 is B1 since A1 is dependent on B1, which, in turn, is dependent on C1. In this scheme if the matrix entry does not correspond to the component/sub-component corresponding to the column index then an indirect dependency is flagged.

In this embodiment, in addition to providing information about a component/subcomponent's installation-relationships, such as dependencies, each component also includes information about its installing component. An installing component typically, but not always, installs its sub-components. Each installing component has a scope comprising the components it installs, and thus defines a start of a scope in the installation process. An installation component may have sub-components that, in turn, also participate in the installation of other sub-components, and thus define a new scope. Since closely related components are packaged together, scope changes indicate a heightened likelihood of disk swapping.

Returning to FIG. 2, it can be seen that it includes two graphs, defined by different kind of arrows defining their edges, and that each forms one or more trees. The first illustrates the installing components and the sub-components installed by them and the second illustrates the dependency relationship between components and/or sub-components. The graph corresponding to the dependency relationships can be used to perform a depth first tree traversal and generate a valid installation order, if one exists. Additional details about depth first tree traversal are described in Shimon Even, "Graph Algorithms," Chapter 3, Computer Science Press, 1979.

In this context, in order to initiate a tree traversal the concept of an in-degree is useful. The in-degree of a node in a dependency matrix/tree is the number of components that are dependent on the node and are not yet processed. Processing is used to indicate when a component has been included in an installation order being created, or, in other contexts, it refers to a component/sub-component being installed or removed. A component may be included in an installation order being generated when its in-degree is 0, i.e., no components dependent on it are left unprocessed. This ordering ensures that the component on which other components are dependent, directly or indirectly, is installed first when the generated installation order is traversed.

Given an installation-affecting relationship tree, e.g., a dependency tree, depth first ordering is advantageously used to list the nodes in the tree in an Installation_order list. This list is processed during installation in a First-In-Last-Out process so that the first component processed in generating the list is actually the last component installed. In a corresponding installation relationship matrix the leaf nodes have no dependent nodes, and consequently each have an in-degree of 0. An arbitrary, but preferably consistent, scheme may be used to select one of the leaf nodes for processing. Thus, the first leaf node encountered or the leaf node with the smallest GUID is selected and placed in the installation order list. Alternatively, a component that resides on the earliest indexed installation media may be selected, e.g., on CD1 in a multi-CD installation set. Then, the dependency matrix is modified by reducing the in-degree of each component on which the selected leaf node is dependent by 1.

Each processed node is in the scope of its installing component. Given more than one candidate node with in-degree equal to 0 to process, a node is selected such that it requires the smallest scope transition. Thus, each component/sub-components has associated with it an in-degree parameter, reflecting the remaining components subject to the installation-affecting relationship, and a scope indicating its installing component. The smallest scope transition could be, for instance, the scope encountered most recently, although other formulations may be used to account for various methods of bundling software. This process is repeated until the entire dependency matrix, i.e., tree(s) within it have been processed. The installation order list so generated is a valid installation order that is also a good installation order. Table 2 below and the accompanying discussion presents an example to illustrate the use of in-degree and scope parameters.

TABLE 2

|     | A  | A1 | A2 | A21 | A22 | A3 | B  | B1 |
|-----|----|----|----|-----|-----|----|----|----|
| A   | DF |    |    |     |     |    |    |    |
| A1  | A  | DF |    |     |     |    |    |    |
| A2  | A  |    | DF |     |     |    |    |    |
| A21 | A2 |    | A2 | DF  |     |    |    |    |
| A22 | A2 |    | A2 |     | DF  |    |    |    |
| A3  | A  |    |    |     |     | DF | B1 | B1 |
| B   |    |    |    |     |     |    | DF |    |
| B1  |    |    |    |     |     |    | B  | DF |

Figure 3:
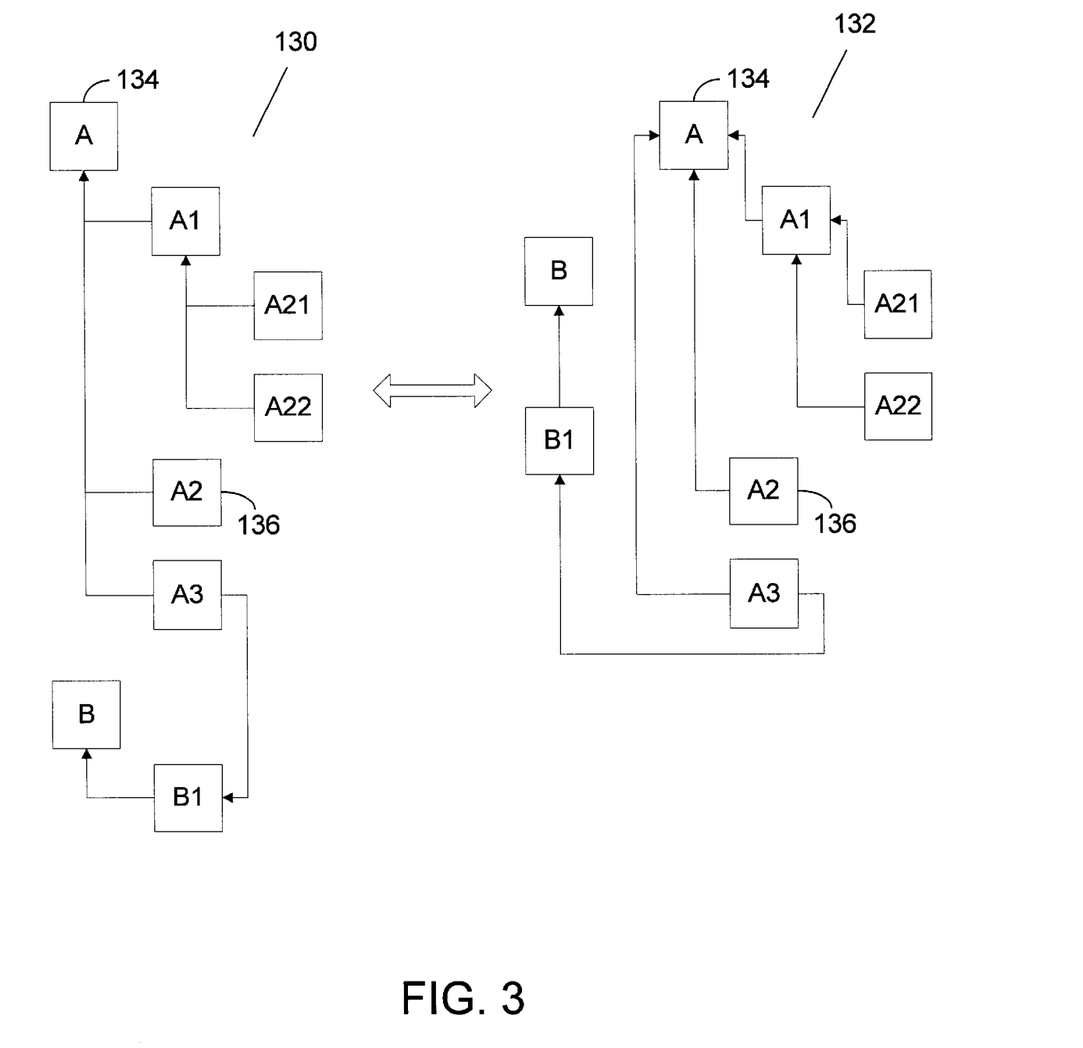
FIG. 3 is a block diagram generally illustrating two representations of a tree structure with directed edges representing non-reciprocal installation-affecting relationships between software components/sub-components.

The matrix in Table 2 corresponds to the equivalent graphs 130 and 132 in FIG. 3, which are also termed digraphs or directed graphs due to non-reciprocal relationships between the nodes, e.g., nodes 134 and 136, defining the edges. Table 3, below, corresponds to Table 2 and illustrates the associated in-degree and scope parameters.

TABLE 3

| Component/components | Scope | In-Degree |
|---|---|---|
| A   | S1 | 5 |
| A1  | S1 | 0 |
| A2  | S2 | 2 |
| A21 | S2 | 0 |
| A22 | S2 | 0 |
| A3  | S1 | 0 |
| B   | S3 | 2 |
| B1  | S3 | 1 |

Following an examination of the matrix in Table 2, the component A3 is selected and placed in an Installation_order list because in has an in-degree of 0 and has the largest index among the nodes with in-degree of 0.

TABLE 4

| Component/components | Scope | In-Degree |
| --- | --- | --- |
| A | S1 | 4 |
| A1 | S1 | 0 |
| A2 | S2 | 2 |
| A21 | S2 | 0 |
| A22 | S2 | 0 |
| A3 | >S1 | 0 |
| B | S3 | 1 |
| B1 | S3 | 0 |

In general, instead of the index the GUID for the components may be used to make such a decision. Subsequently, the Scope/In-degree table is updated to obtain Table 4. The updating step resulted in a reduction in the in-degree parameter for A, B and B1 since A3 has already been processed. Furthermore, processing A3 sets a current_scope, indicated by the ">" sign in Table 4, at S1 corresponding to components/sub-components installed by A. The remaining four nodes with in-degree of 0 are examined and A1 is selected since it has the same scope as A3, i.e., the current_scope. It is noteworthy that new nodes with in-degree of 0 are generated in each interation. However, already processed nodes are not processed again to avoid non-terminating loops by maintaining a list of processed node, or by marking a node as being processed or by using a value for the in-degree parameter to flag a processed state.

TABLE 5

| Component/components | Scope | In-Degree |
| --- | --- | --- |
| A | S1 | 3 |
| A1 | >S1 | 0 |
| A2 | S2 | 2 |
| A21 | S2 | 0 |
| A22 | S2 | 0 |
| A3 | S1 | 0 |
| B | S3 | 1 |
| B1 | S3 | 0 |

The Scope/in-degree Table 4 is updated to obtain Table 5 with the current scope remaining unchanged. In a similar manner components/sub-components A22, A21, and then A1 are processed and added to the installation-order list to give A3, A1, A22, A21, A2, A with scope transition to S2 when A2 is the installing component and back to A1 when A is installed. Then the remaining nodes are processed to generate the installation order as A3, A1, A22, A21, A2, A, B1 and B. Since the actual installation is First-In-Last-Out, component B is installed before component B1 and the like. The installation order so generated is a valid installation order that is also a good order since it reduces the number of scope transitions. For instance, A21 or A22 etc. might have been chosen instead of A1 without invalidating the Installation_order list.

To the extent a component/sub-component has a unique identifier to distinguish its versions from each other, then if a valid installation order exists the procedure described above does not encounter the possibility of cycles, i.e., the dependency matrix may represent a graph that is not a tree. A cycle implies that a first component is dependent on a second component, which, in turn, is dependent on the first component. Thus neither can be installed. However, if components/sub-components do not have globally unique identifiers then versions or other parameters associated with components can be used to distinguish between similar components/sub-components so that an apparent cycle is avoided. It should be noted that it is assumed that the components/sub-components being evaluated are installed/removed at the end of the installation process. However, it is possible to concatenate several different installation/removal tasks.

It is to be noted that the procedure outlined above can be modified to check if a provided installation order is valid. In order to check the validity of an installation order, some of the steps are reversed while others are modified. Thus, there is no need to select a node with in-degree of 0, but, instead, it is tested that each listed node has an in-degree of 0 when processed in accordance with the procedure. An installation relationship matrix is constructed and the first node chosen is the first node in the installation order being tested. If the node has a corresponding in-degree other than 0 then the given order is invalid, else the scope/in-degree table is updated and the same test applied to the second node in the installation order being tested. This process is repeated until either the condition fails or the entire installation order has been tested. Furthermore, by counting the scope transitions, it is possible to compare two installation orders to determine which is better, i.e., has the fewer scope transitions. The ability to compare and/or validate installation orders can advantageously be provided as APIs or functions.

In some scenarios it may not be possible to separate the sub-components from a component, i.e., they are processed/installed as a unit. Then, it is desirable to distinguish between the order of installation of sub-components of a component and the installation of another set of component/sub-components. This notion may be generalized by considering a first set of sub-components of a first component to be in the meta-scope of the first component, i.e., a first meta-scope, while a second set of sub-components of a second component are in the meta-scope a second component giving rise to a second meta-scope. A dependency relationship between sub-components defines a relationship between the two meta-scopes. Thus, if one of the first set of sub-components is dependent on one of the component/sub-components in the second meta-scope then the component/sub-components in the second meta-scope have to be installed prior to the installation of the component/sub-components in the first meta-scope. In other words, the first meta-scope/first set of sub-components is dependent on the second meta scope/second set of sub-components.

This modified scenario is advantageously handled in accordance with the invention by identifying a meta-scope with no dependencies on another meta-scope analogously to the in-degree in the case of components/sub-components discussed in earlier embodiments. The components/sub-components within the selected meta-scope are processed prior to switching scopes after accounting for the complete processing of the selected meta-scope. A natural consequence of the restriction that a meta-scope, i.e., components/sub-components within it, be processed prior to switching to another meta-scope is that any two meta-scopes cannot be dependent on each other since this would amount to a cycle in a graph representing the dependency relationships between meta-scopes.

The installation-affecting relationship considered so far has been the dependency relationship. A mutually exclusive relationship is another possible installation-affecting relationship. In a mutually exclusive relationship a first component and a second component cannot be installed together in a computing environment. Thus, installation of the first component requires removal of the second component if present and vice versa. However, removal of the second component also requires the removal of other components/sub-components dependent on the second component. Furthermore, this removal has to be orderly so that components/sub-components dependent on the second component are removed prior to the removal of the second component.

This is the reverse of the problem encountered in the dependency relationships based computations. A valid removal order can be generated, e.g., by traversing the relevant portions of the installation-affecting relationship tree in accordance with depth-first ordering. The Installation_order list so constructed is used in a First-In-First-Out fashion than the familiar First-In-Last-Out processing described for installation of components having dependency relationships. A suitable installation-affecting relationship tree has the second component as its root node with the branches being defined by the dependency relationships discussed previously.

Figure 4:
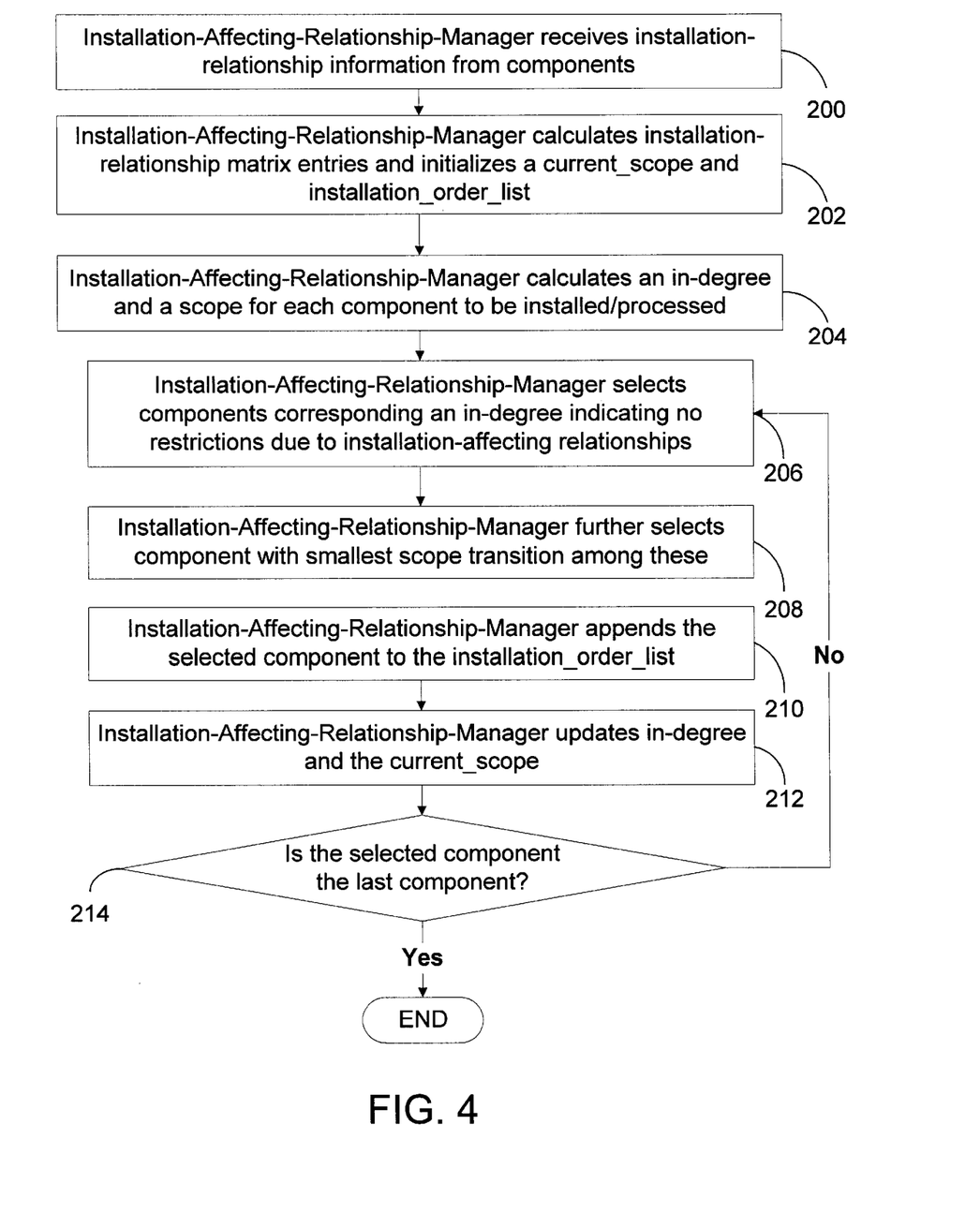
FIG. 4 illustrates a flowchart describing an installation strategy in accordance with the invention.
Figure 5:
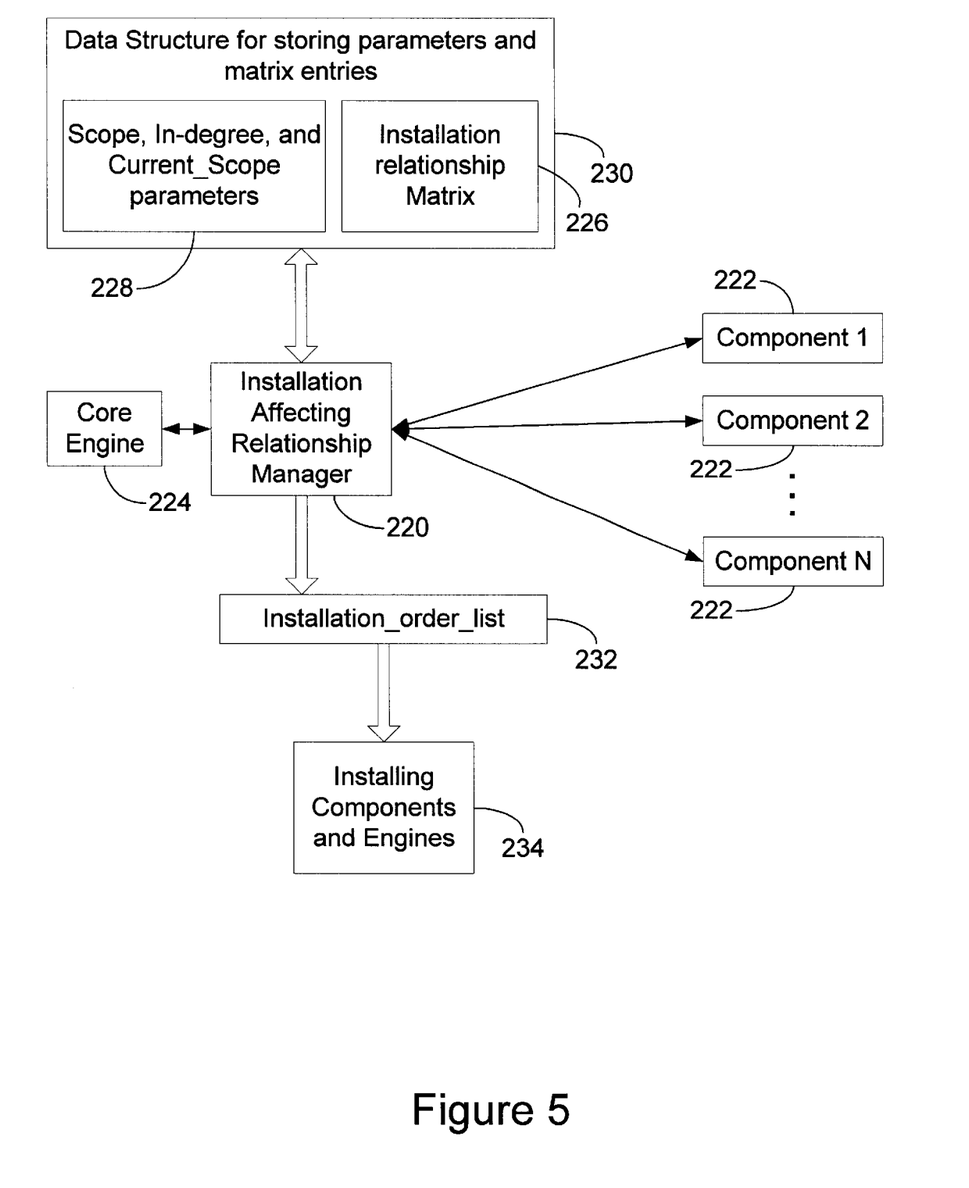
FIG. 5 illustrates a possible embodiment of the invention.

FIGS. 4 and 5 illustrate a method and system in an embodiment in accordance with the invention. An installation-affecting-relationship-manager 220 receives installation-affecting relationship information from components 222 to be installed (step 200). Additional information may be received by the installation-affecting-relationship manager 220 from a Core Engine 224, e.g., a list of components 222 to be installed and the like. The installation-affecting-relationship manager 220 computes entries for an installation-relationship matrix 226 and initializes parameters 228 and in a data structure 230 as well as an Installation_order list 232 (step 202). The installation-affecting-relationship manager 220 computes an in-degree parameter and a scope parameter for each component 222 to be installed or processed (step 204). It is to be noted that there is no requirement that components 222 be related or be represented as a single tree or connected graph.

The installation-affecting-relationship manager 220 selects components corresponding to an in-degree parameter indicating no restrictions on installation or processing due to installation-affecting relationships (step 206). In the case of dependency relationships, there should be no components dependent on the selected component that have not been processed. Processing here means adding to the Installation_order list. The installation-affecting-relationship manager 220 next selects a component from these selected components, if there are two or more selected components, such that the selected component has a scope that results in the least change in the current_scope parameter (step 208). Furthermore, in the event of a tie, a default preference is made, e.g., the component with the smallest GUID/unique identifier. The selected component is appended to the Installation_order list (step 210) followed by updating the in-degree parameters for the remaining components and updates the current scope to the scope of the selected component (step 212). If the selected component is the last component to be processed (step 214) then the method terminates, else it loops back to step 206.

The result of the described procedure is the Installation_order list which is traversed in the opposite direction, i.e., than which it was outputted, in course of installation of the components. This results in a First-In-Last-Out installation of the components by Installing components and engines 234.

This procedure can be launched at various times to update or modify a system. Thus, its utility extends beyond mere installation of software suites such as "MICROSOFT BACKOFFICE®" or other server packages. It could be invoked in games to install and remove modules as players move from one level to another or from one stage to another stage requiring different software. Furthermore, since such a setup and management procedure can run in the background it can be used to swap applications that are otherwise incompatible so that launching of one results in orderly removal of the other and vice-versa. The utility of such a procedure in networking applications is even more interesting since a network may load or remove an application in response to a user request such that user's machine, which is connected to the network, remains updated and conflict free regardless of the application launched by the user.

In response to a request for an application to be launched, the core installation engine 224 and the installation-affecting-relationship manager 220 are invoked in the context of the requested application, i.e., its components and sub-components. The current state of the user's machine is determined. If one or more components are incompatible with the components to be loaded, the offending components are removed in an orderly fashion so that components dependent on them are also removed. The procedure described for the mutually exclusive relationship can be used to implement this operation in accordance with the invention. This is followed by installation of the requested components, also in accordance with the invention, e.g., the method outlined in the flow chart in FIG. 4. Consequently, the network becomes automatically configurable for each user, and thus makes it dynamic and more responsive while ensuring that management of the network is simplified at the same time, even for hosting potentially conflicting applications.

Figure 6A:
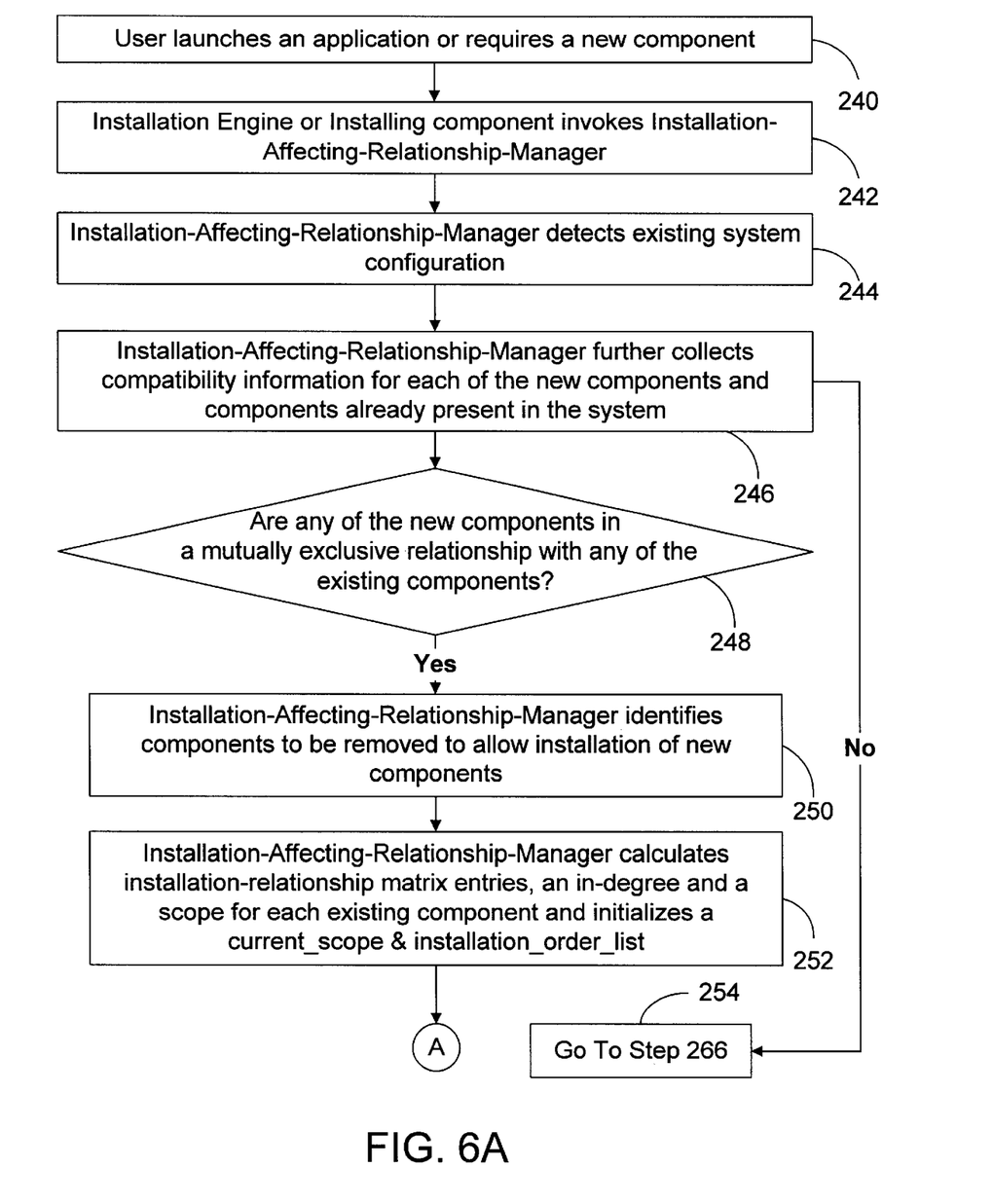
FIGS. 6A and 6B illustrate flowcharts describing removal as well as installation of software to overcome incompatibilities or a resource crunch.
Figure 6B:
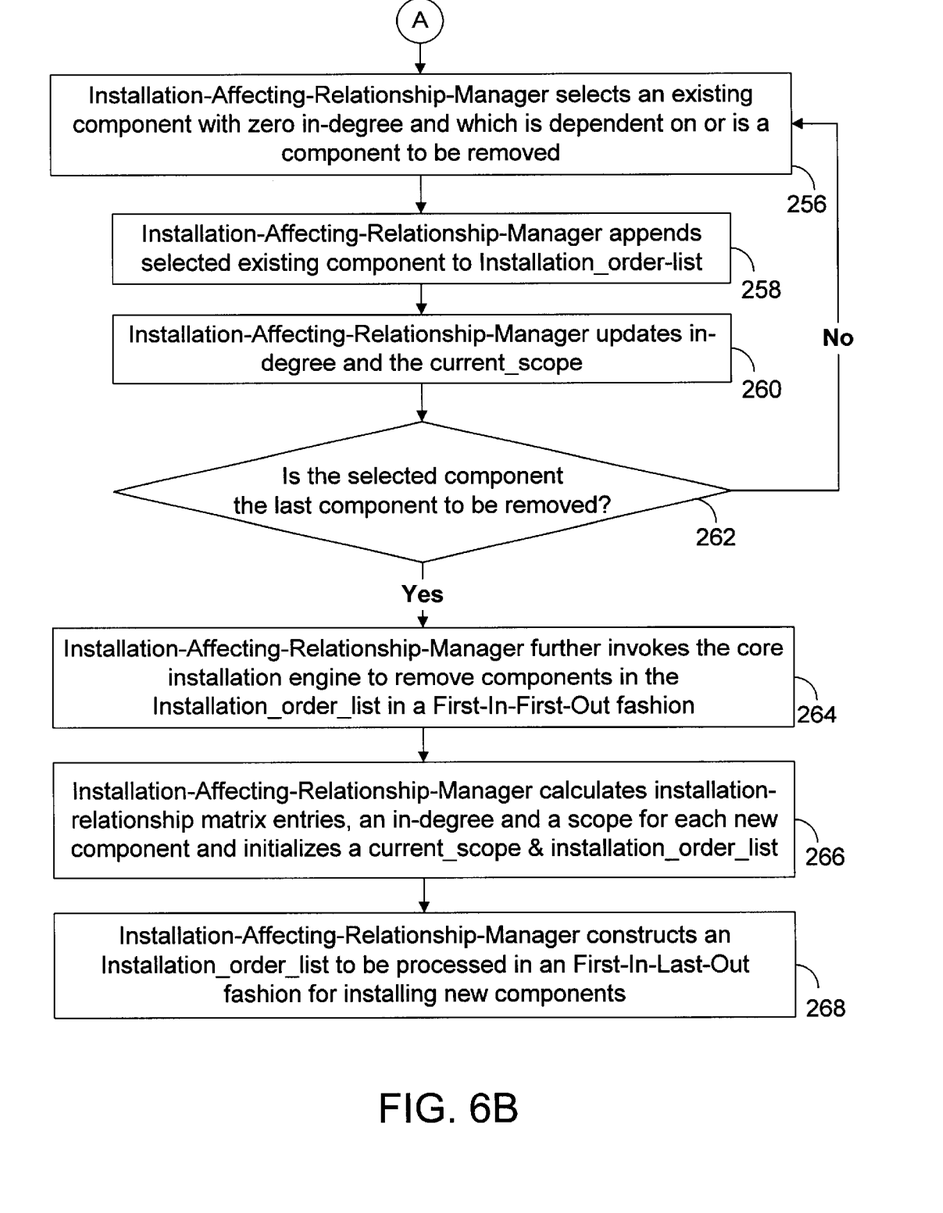

FIG. 6 illustrates a flowchart illustrating an embodiment implementing dynamic installation/deinstallation in response to user selections. The embodiment may be implemented in computing environment 20 of FIG. 1 or in computing environments implemented as networked machines. The details of installation, such as a possible repository from which files may be copied or a software for tracking the location of installed or deinstalled software in the network can be implemented, if desired, by any means known to one of ordinary skill in the art. Thus, particular methods for additional management functions in a network are not to be read as limitations in this context.

FIG. 6A illustrates a method where a user launches an application or requires a component that is not present/accessible on the user's machine (step 240). Thus, the user may make a selection from a menu, toolbar or even a set of icons or naturally reach a stage in using the system where additional components have to be loaded. The latter could be due to lack of system resources preventing all components to load and/or a game where context-specific components are required to implement a desired set of functions. Responsive to the need for new components, the installation engine or the software responsible for installing the new components invokes the installation-affecting-relationship-manager (step 242). The installation-affecting-relationship-manager detects the existing system configuration by, e.g., accessing a registry, to determine the components already present in the machine (step 244). The installation-affecting-relationship-manager, then, collects information from the components to be installed and those already present, step 246, to determine if there is a mutually exclusive relationship requiring removal of some components prior to installation of new components (step 248). Step 248 identifies a need to remove components if there is a resource crunch although the components to be removed may not be incompatible with the new components in a logical sense. If there is no need to remove a component already present, the control passes to step 266, in step 254, for initiating installation of the new components.

In the event some components present on the system have to be removed, they are identified in step 250, e.g., by the mutually exclusive relationship or by flagging the least used components, or the need to release sufficient resources in different implementations and the like. Having identified components to be removed, it is imperative to also remove components dependent on the components so identified. To this end, in step 252, the installation-affecting-relationship-manager constructs the installation-relationship matrix with the rows labeled by components to be removed and the columns labeled by components present in the system followed by relaxation to enumerate all components that are directly or indirectly dependent on the components identified for removal. Naturally, the use of rows and columns is not a requirement, and even the convenient construct of a matrix may be replaced by alternative logical structures, such as linked lists in alternative embodiments.

FIG. 6B illustrates steps subsequent to those illustrated in FIG. 6A. Thus, the installation-affecting-relationship-manager selects an existing component that is either to be removed or is dependent on a component to be removed, such that the selected component has an in-degree of zero to indicate that all components dependent on it have been processed (step 256). This selected component is appended to the Installation_order list in step 258. Next, the in-degree parameter and the current scope are updated to reflect the processing of the selected component in step 260. In some embodiments the in-degree parameter may be set to preset value to indicate that the corresponding component has been processed. Alternatively, a table of processed components may be maintained to avoid repeatedly processing the same component.

If the selected component is the last component that needs to be processed (step 262) then the installation-affecting-relationship-manager returns control or other invokes the installation engine to effect removal of the components in accordance with the Installation_order list (step 264). In contrast to the First-In-Last-Out processing in the case of installing components, now the list is processed in a First-In-First-Out manner to remove components in an orderly fashion. The removed components may not necessarily be deleted, but instead may merely be made inactive to avoid conflicts with components to be installed next.

Following the deinstallation of components, the installation-affecting-relationship manager initializes the various parameters and calculates entries for the installation-relationship matrix, which, now has row indices corresponding to the new components and column indices corresponding to components remaining in the system and the new components (step 266). A new Installation_order list is constructed and, subsequently, processed in a First-In-Last-Out fashion for installing the new components to complete the procedure (step 268). The details are similar to the method described in FIG. 4 although they need not be identical.

Furthermore, it should be noted that if several software packages are to be installed, then their installation may be concatenated to generate an Installation_order list that reflects the overall installation. To this end, a first Installation_order list and a first Removal_order list are created for a first software package. Without actually installing the first software package, a second software package is processed as if the first package is already up and running, i.e., treated as being part of the system configuration for the purpose of calculating the installation-relationship-matrix. Then, a second Installation_order list is generated along with a second Removal_order list. Such removal and Installation_order lists can be combined to effect greater optimization. In an embodiment of the invention, the dependency relationships between components that are installing and removing are evaluated to ensure that installing and removing components are independent of each other.

In view of the many possible embodiments to which the principals of this invention may be applied, it should be recognized that the embodiment described herein with respect to the drawing figures is meant to be illustrative only and should not be taken as limiting the scope of the invention. It should also be recognized that the ordering and the specific implementation of the steps described above may be altered in obvious ways.

Finally, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for generating an Installation_order list for installing software in a computing environment, the computing environment having a configuration defined by a plurality of installed components, the software comprising a plurality of components-to-be-installed, the method comprising:

querying the software to discover if a first component from the plurality of components-to-be-installed depends on a second component, the second component being from the plurality of installed components or the plurality of components-to-be-installed;

making a dependency entry in an installation relationship matrix, the dependency entry indexed by an identifier corresponding to the first component and an identifier corresponding to the second component, to represent that the first component is dependent on the second component reflecting the requirement that the second component be installed prior to the installation of the first component;

evaluating, for at least one of the plurality of components-to-be-installed, an in-degree parameter, the in-degree parameter comprising the number of unprocessed components directly and indirectly dependent on one of the plurality of components-to-be-installed, and wherein, furthermore, no unprocessed component belongs to the Installation_order list selecting an unprocessed component from the plurality of components-to-be-installed, the unprocessed component not being a dependency of any other unprocessed component from the plurality components-to-be-installed; and adding the unprocessed component to the Installation-order list.

2. The method of claim 1 having, furthermore, the step of making an indirect-dependency entry in an installation-relationship matrix, the indirect-dependency entry indexed by an identifier corresponding to the first component and another identifier corresponding to a fourth component to represent indirect dependency of the first component on the fourth component, the fourth component being from the plurality of installed components or the plurality of components-to-be-installed.

3. The method of claim 2 wherein the step of making an entry in an installation relationship matrix to represent indirect dependency further includes the step of identifying a third component such that the first component is not dependent on the third component and the first component is directly or indirectly dependent on an intermediate component, which, in turn, is dependent on the third component.

4. The method of claim 3 wherein the step of making the entry in an installation-relationship matrix to represent indirect dependency of the first component on the third component ensures that the entry corresponds to a direct-intermediate component, wherein the first component is directly dependent on the direct-intermediate component, which, in turn, is directly or indirectly dependent on the third component.

5. The method of claim 1 further having the step of treating the first component dependent on the second component as being dependent on every component in a meta-scope of the second component, wherein all components in the meta-scope are installed together.

6. The method of claim 1 having, furthermore, the step of deciding that a valid installation order does not exist if there is at least one unprocessed component in the plurality of components-to-be-installed but there is no unprocessed component in the plurality of components-to-be-installed that is not a dependency of another unprocessed component in the plurality of components-to-be-installed.

7. The method of claim 1 further having the step of marking the unprocessed component as being processed and then updating an in-degree corresponding to each unprocessed component from the plurality of components-to-be-installed.

8. The method of claim 1 further having the step of installing in the computing environment, in a First-In-Last-Out order, components corresponding to entries in the Installation_order list.

9. The method of claim 1 wherein a component corresponding to in-degree equal to a default value has no unprocessed component dependent on it.

10. The method of claim 1 wherein the dependency entry in an installation-relationship matrix has a value corresponding to the second component to indicate direct dependency of the first component on the second component.

11. The method of claim 2 wherein the indirect-dependency entry in an installation relationship matrix has a value corresponding to the second component to indicate direct dependency of the first component on the second component, which, in turn, is dependent on the third component.

12. A computer readable medium having computer executable instructions for performing the steps of a method of generating an Installation_order list for installing software on a computer system, the computer system having a configuration defined by a plurality of installed components, the software comprising a plurality of components-to-be-installed, the steps comprising:

querying the software to discover if a first component from the plurality of components-to-be-installed depends on a second component, the second component being from the plurality of installed components or the plurality of components-to-be-installed;

making a dependency entry in an installation relationship matrix, the dependency entry indexed by an identifier corresponding to the first component and an identifier corresponding to the second component, to represent that the first component is dependent on the second component reflecting the requirement that the second component be installed prior to the installation of the first component;

evaluating, for at least one of the plurality of components-to-be-installed, an in-degree parameter, the in-degree parameter comprising the number of unprocessed components directly and indirectly dependent on one of the plurality of components-to-be-installed, and wherein, furthermore, no unprocessed component belongs to the Installation_order list;

selecting an unprocessed component from the plurality of components-to-be-installed, the unprocessed component not being a dependency of any other unprocessed component from the plurality components-to-be-installed; and adding the unprocessed component to the Installation-order list.

13. The computer readable medium of claim 12 having, furthermore, computer executable instructions for implementing the step of making an indirect-dependency entry in an installation-relationship matrix, the indirect-dependency entry indexed by an identifier corresponding to the first component and another identifier corresponding to a fourth component to represent indirect dependency of the first component on the fourth component, the fourth component being from the plurality of installed components or the plurality of components-to-be-installed.

14. The computer readable medium of claim 13 wherein computer executable instructions for implementing the step of making an entry in an installation relationship matrix to represent indirect dependency further include computer executable instructions for implementing the step of identifying a third component such that the first component is not dependent on the third component and the first component is directly or indirectly dependent on an intermediate component which, in turn, is dependent on the third component.

15. The computer readable medium of claim 14 wherein instructions for making the entry in an installation-relationship matrix to represent indirect dependency of the first component on the third component ensure that the entry corresponds to a direct-intermediate component, wherein the first component is directly dependent on the direct-intermediate component, which, in turn, is directly or indirectly dependent on the third component.

16. The computer readable medium of claim 12 further having computer executable instructions for implementing the step of treating the first component dependent on the second component as being dependent on every component in a meta-scope of the second component, wherein all components in the meta-scope are installed together.

17. The computer readable medium of claim 16, furthermore, having computer executable instructions for implementing the step of deciding that a valid installation order does not exist if there is at least one unprocessed component in the plurality of components-to-be-installed but there is no unprocessed component in the plurality of components-to-be-installed that is not a dependency of another unprocessed component in the plurality of components-to-be-installed.

18. The computer readable medium of claim 17 further having computer executable instructions for implementing the steps of marking the unprocessed component as being processed and, then, updating an in-degree corresponding to each unprocessed component from the plurality of components-to-be-installed.

19. The computer readable medium of claim 12 further having computer executable instructions for implementing the step of installing in the computing environment, in a First-In-Last-Out order, components corresponding to entries in the Installation_order list.

20. The computer readable medium of claim 12 wherein computer executable instructions for a component corresponding to in-degree equal to a default value has no unprocessed component dependent on it.

21. The computer readable medium of claim 12 wherein computer executable instructions for making the dependency entry in an installation-relationship matrix assign it a value corresponding to the second component to indicate direct dependency of the first component on the second component.

22. The computer readable medium of claim 13 wherein computer executable instructions for making the indirect-dependency entry in an installation relationship matrix assign it a value corresponding to the second component to indicate direct dependency of the first component on the second component, which, in turn, is dependent on the third component.

23. A method for installing a plurality of software components in a computing environment, the computing environment including a plurality of installed components, and wherein at least one of the plurality of components-to-be-installed having a description of at least one installation-affecting relationship between one of the software components and other components in the computing environment, the method comprising:

calculating an in-degree for each of the plurality of software-components by inspecting installation-affecting relationships, the in-degree for each of the plurality of software components corresponding to a number of components dependent on the each of the plurality of software components, wherein, furthermore, a value of zero for in-degree of a component represents that the component has no unprocessed dependent components in the plurality of software components;

determining a scope for at least one of the plurality of software components by identifying an installer for the one of the plurality of software component;

selecting a first component with in-degree of zero from the plurality of software components and wherein installation of the first component requires no more scope transitions than any other component with in-degree of zero from the plurality of software components;

installing the first component with an in-degree of zero from the plurality of software components; and removing the first component from the plurality of software components.

24. The method of claim 23 wherein the step of calculating the in-degree of each of the plurality of software components further including the step of updating in-degree for at least one unprocessed component from the plurality of software components.

25. The method of claim 23 wherein the step of selecting the first component further includes the step of evaluating scope transitions to ensure that installation of the first component requires no more scope transitions than any other component, from the plurality of components-to-be-installed, having in-degree equal to the default value.

26. A computer readable medium having computer executable instructions for performing the steps of a method for installing a plurality of software components in a computing environment, the computing environment including a plurality of installed components, and wherein at least one of the plurality of components-to-be-installed having a description of at least one installation-affecting relationship between one of the software components and other components in the computing environment, the steps comprising:

calculating an in-degree for each of the plurality of software-components by inspecting installation-affecting relationships, the in-degree for each of the plurality of software-components corresponding to a number of components dependent on the each of the plurality of software components, wherein, furthermore, a value of zero for in-degree of a component represents that the component has no unprocessed dependent components in the plurality of software components;

determining a scope for at least one of the plurality of software components by identifying an installer for the one of the plurality of software component;

selecting a first component with in-degree of zero from the plurality of software components and wherein installation of the first component requires no more scope transitions than any other component with in-degree of zero from the plurality of software components;

installing the first component with an in-degree of zero from the plurality of software components; and removing the first component from the plurality of software components.

27. The method of claim 26 wherein the step of calculating the in-degree of each of the plurality of software components further including the step of updating in-degree for at least one unprocessed component from the plurality of software components.

28. The method of claim 26 wherein the step of selecting the first component further includes the step of evaluating scope transitions to ensure that installation of the first component requires no more scope transitions than any other component, from the plurality of components-to-be-installed, having in-degree equal to the default value.

29. A computer-readable medium having stored thereon a data structure for storing and managing installation-affecting relationships between a plurality of components-to-be-installed and a plurality of installed-components in a computing environment, the data structure comprising:

an interface for discovering a specified installation-affecting relationship between two components;

a memory location for storing an in-degree parameter for a first component from the plurality of components-to-be-installed wherein the in-degree parameter comprises a count of unprocessed components from the plurality of components-to-be-installed that are dependent on the first component;

a linked list of entries corresponding to entries in an installation-relationship matrix wherein at least one of the entries in the installation-relationship matrix corresponds to the first component from the plurality of components-to-be-installed and its installation-affecting relationship with a second component, the second component from the plurality of components-to-be-installed or the plurality of installed components, the linked list further including linkages for traversing the installation-relationship matrix;

a memory location for storing a first scope for the first component; and a list of memory locations for storing a unique identifier for each one of the plurality of components-to-be-installed following processing in an order corresponding to the order for installing the components.

30. A system for managing installation of software in a computing environment, the software comprising a plurality of components-to-be-installed, at least one of the plurality of components-to-be-installed including a description of a non-default installation-affecting relationship, the non-default installation-affecting relationship specifying at least a presence or absence of a component of interest in order to carry out the installation, wherein, furthermore, a first component from the plurality of components-to-be-installed is installed in accordance with an installation-affecting relationship corresponding to the first component, the system comprising:

an installation-affecting relationship manager for detecting installed-components in the computing environment and, furthermore, generating a representation of installation-affecting relationships between each of the plurality of components-to-be-installed and remaining components from the plurality of components-to-be-installed or a plurality of installed components;

an installation core engine for actually installing at least one component from the plurality of components-to-be-installed; and an Installation_order list for providing a next installable component from the plurality of installable components, the Installation_order list generated in an iterative manner by the installation-affecting relationship manager by, at least:

calculating an in-degree for each of the plurality of components-to-be-installed by inspecting installation-affecting relationships, the in-degree for each of the plurality of components-to-be-installed comprising a count of components dependent on the each of the plurality of components-to-be-installed, wherein, furthermore, a count of zero for the in-degree of a component represents that the component has no unprocessed dependent components in the plurality of components to be installed;

identifying an unprocessed component from the plurality of components-to-be-installed having no other unprocessed component from the plurality of components-to-be-installed in an installation-affecting relationship requiring the unprocessed component to be installed earlier;

adding the identified unprocessed component to the Installation_order list; and marking the identified unprocessed component as being processed in subsequent iterations.

31. A method of installing software on a computer system, the computer system having a plurality of installed components, the software comprising a plurality of components-to-be-installed, each component in the plurality of installed components or the plurality of components-to-be-installed having a unique identifier, the method comprising:

querying a component from the software to discover an installation-affecting relationship between a first and a second component from the plurality of components-to-be-installed;

making an entry in an installation relationship matrix to represent the installation-affecting relationship between the first component and the second component, the entry being indexed by the first component and the second component;

examining the installation relationship matrix to detect a direct or indirect installation-affecting relationship between the second component and a third component;

making an entry in an installation relationship matrix to represent the indirect installation-affecting relationship between the first component and the third component corresponding to the installation-affecting relationship between the second component and the third component;

generating a tree from the installation-relationship matrix wherein a child node in the tree is dependent on its parent node; and generating an Installation_order list from the tree by listing order of nodes visited while traversing the tree in a depth first manner.

32. A method for removing a first component from a computing environment, the computing environment having a plurality of installed components, with the aid of an iteratively created Installation_order list, wherein, furthermore, at least one component from the plurality of installed components is dependent on the first component, the method comprising the steps of:

creating an installation-affecting relationship matrix with entries corresponding to dependency on the first component or on a second component, dependent on the first component, from the plurality of installed components;

calculating an in-degree for each of the plurality of installed components by inspecting installation-affecting relationships, the in-degree for each of the plurality of installed components comprising a count of components dependent on the each of the plurality of installed components, wherein, furthermore, a count of zero for the in-degree of a component represents that the component has no unprocessed dependent components in the plurality of installed components;

selecting an unprocessed component, from the plurality of installed components, directly or indirectly dependent on the first component such that there is no unprocessed component, from the plurality of installed components, dependent on the selected component, and, wherein, no unprocessed component is present in the Installation_order list;

adding the selected unprocessed component to the Installation_order list and marking the selected unprocessed component as being processed; and removing from the computing environment, in a First-In-First-Out order, components listed in the Installation_order list.

33. The method of claim 31 wherein the computing environment is connected to a network.

34. The method of claim 31 wherein the step of creating the installation-affecting relationship matrix is in response to detecting at least one component, from the plurality of installed components, that has to be removed from the computing environment in order to allow installation of a new component in the computing environment.

35. The method of claim 34, further comprising a user interface for receiving a selection of a new component by a user, wherein the new component is to be installed in the computing environment.

36. The method of claim 34, wherein the new component is to be installed in the computing environment in response to a requirement for the new component due to an executing application.

37. A dynamic network capable of removing or installing software components from a computing environment in response to a user request for the installation of a selected application, the dynamic network comprising:

at least one server for providing software in response to the user request for the installation of the selected application in the computing environment;

at least one computing machine connected to the dynamic network the computing machine hosting at least a part of the computing environment, the computing environment including an installation-affecting relationship manager;

an Installation_order list generated in an iterative manner by the installation-affecting relationship manager by, at least, calculating an in-degree for each of a plurality of components-to-be-installed by inspecting installation-affecting relationships, the in-degree for each of the plurality of components-to-be-installed comprising a count of components dependent on the each of the plurality of components-to-be-installed, wherein, furthermore, a count of zero for the in-degree of a component represents that the component has no unprocessed dependent components in the plurality of components to be installed; and a module to detect components to be removed from the computing environment in order to permit installation of the selected application in the computing environment.

38. A method for validating an Installation_order list, the Installation_order list listing a plurality of components-to-be-installed in an order suitable for installation of the plurality of components-to-be-installed in a computing environment, the computing environment having a plurality of installed components, the method comprising the steps of:

constructing an installation-affecting relationship matrix with each entry corresponding to an installation-affecting relationship between a component from the plurality of components-to-be-installed and a component from the plurality of components-to-be-installed or the plurality of installed components;

choosing each entry, in a First-In-First-Out manner, while the Installation order list has not been invalidated from the Installation order list, each entry corresponding to an untested component from the plurality of components-to-be-installed; and for each chosen untested component, further steps, comprising:

evaluating an in-degree parameter for each untested component in the Installation_order list, wherein the in-degree parameter corresponds to the number of untested components dependent on the untested component corresponding to the in-degree parameter;

invalidating the Installation_order list if the chosen untested component has an in-degree parameter indicating there are other untested components dependent on the chosen untested component;

marking the chosen untested component as being tested if it does not result in invalidating the Installation_order list; and validating the Installation_order list if there is no entry available in the Installation_order list corresponding to an untested component.

39. The method of claim 38 having furthermore the step of tracking the number of changes in a local scope parameter during validation of the Installation_order list, the local scope parameter corresponding to an installing component for the chosen untested component, to obtain a measure of goodness of the Installation_order list.

40. The method of claim 39 having, furthermore, the step of comparing the measure of goodness of the Installation_order list with a measure of goodness of another Installation_order list to select an installation order corresponding to smaller of the two measures of goodness.

* * * * *